United States Patent [19]
Vogler

[11] Patent Number: 4,662,022
[45] Date of Patent: May 5, 1987

[54] APPARATUS FOR CLEANING SOLDERING IRON BITS

[75] Inventor: Franz Vogler, Niederrohrdorf, Switzerland

[73] Assignee: Elvo Elektronik AG, Niederrohrdorf, Switzerland

[21] Appl. No.: 775,540

[22] Filed: Sep. 13, 1985

[30] Foreign Application Priority Data

Sep. 21, 1984 [CH] Switzerland .......................... 4535/84

[51] Int. Cl.⁴ ............................................. A46B 13/02
[52] U.S. Cl. ................................. 15/97 R; 200/61.59; 219/242; 228/57; 248/117.2
[58] Field of Search .................. 15/97 R, 210 R, 105, 15/236 R; 200/61.59; 219/242; 228/57; 248/117.1–117.7

[56] References Cited

U.S. PATENT DOCUMENTS

| | | | |
|---|---|---|---|
| 2,040,214 | 5/1936 | Ramirez, Jr. et al. | 200/61.59 |
| 3,197,868 | 8/1965 | Guichet | 200/61.59 X |
| 3,294,348 | 12/1966 | Cerisano | 248/117.4 |
| 4,394,785 | 7/1983 | Vogler | 15/97 R |
| 4,418,268 | 11/1983 | Munshaw | 248/117.2 |
| 4,456,816 | 6/1984 | Fortune | 248/117.2 |

FOREIGN PATENT DOCUMENTS 0628272 2/1982 Switzerland .......................... 228/57

Primary Examiner—Edward L. Roberts
Attorney, Agent, or Firm—Werner W. Kleeman

[57] ABSTRACT

Two cleaning bodies which rotate towards and in contact with each other, are utilized for quickly mechanically cleaning soldering iron bits or tips and the soldering iron bit or tip is inserted between the cleaning bodies. The rotary movement of the cleaning bodies originates via a drive or gear from a drive motor. A holder is mechanically connected with an actuating member of a switch for operating the drive motor. In the unloaded position of the holder, i.e. when the soldering iron is removed from the holder, the drive motor is switched-on. When the soldering iron bit or tip of the soldering iron is placed into the holder, the holder is loaded and now tilts backwards, causing the actuating member to actuate the switch for operating the drive motor. Thus, the current to the drive motor is turned off and the apparatus is placed out of service. On withdrawal of the soldering iron from the holder, the holder is load-relieved again, the actuating member tilts into the switched-on position and the cleaning bodies begin to rotate again.

10 Claims, 12 Drawing Figures

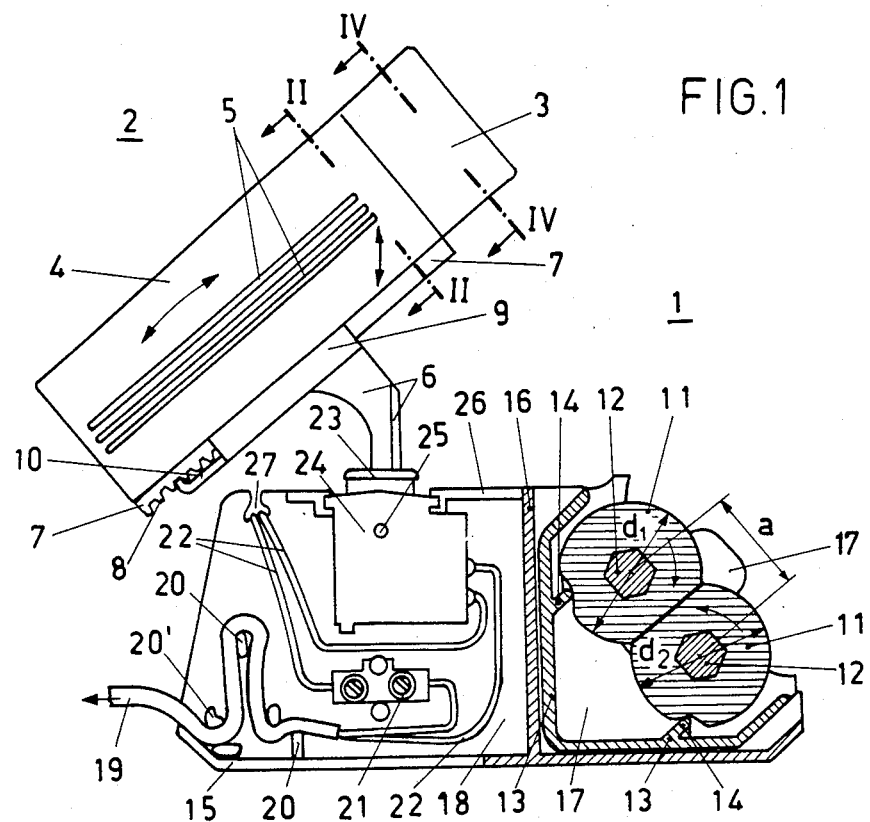
FIG.1
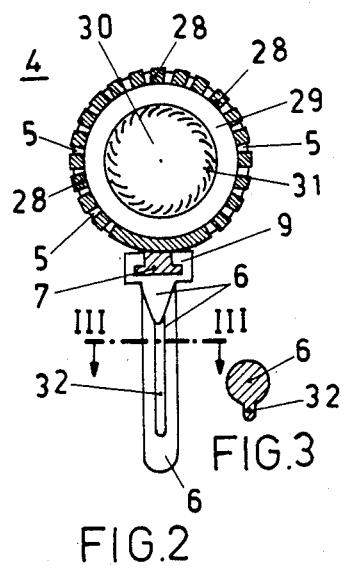
FIG.2
FIG.3
FIG.4
FIG.5
FIG.6

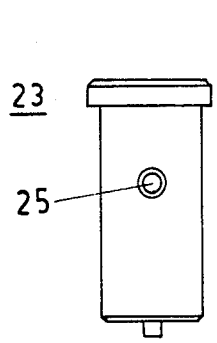
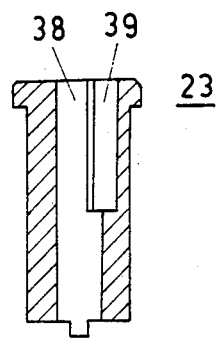
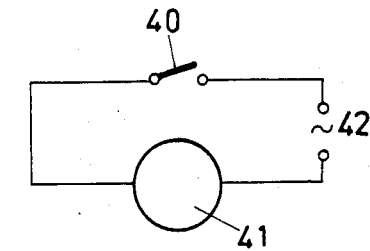
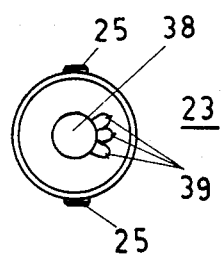
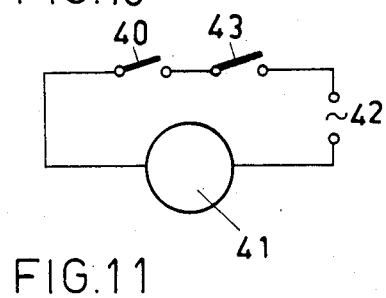
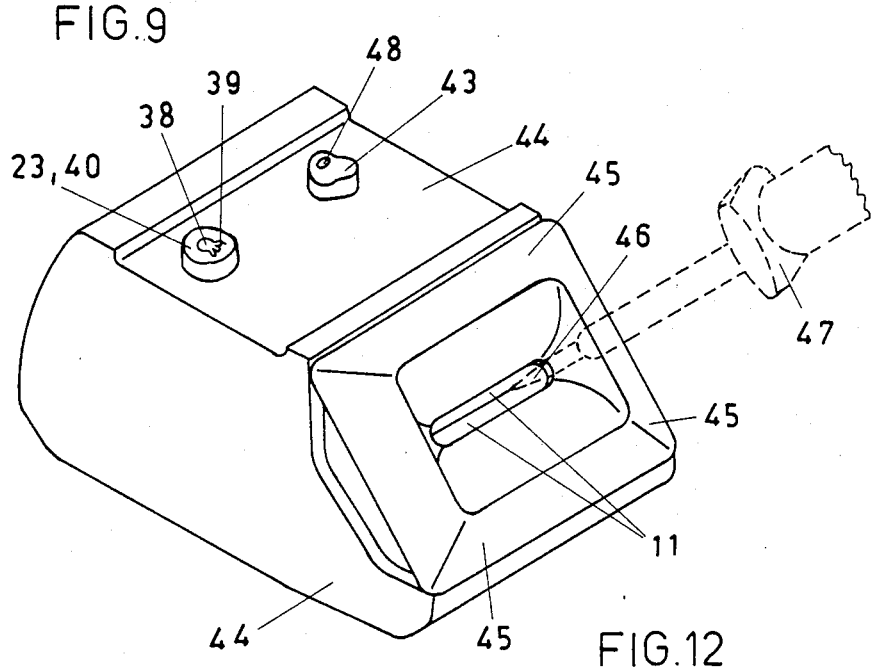

APPARATUS FOR CLEANING SOLDERING IRON BITS

BACKGROUND OF THE INVENTION

The present invention relates to a new and improved apparatus for mechanically cleaning soldering iron bits or tips.

In its more particular apsects, the present invention specifically relates to a new and improved apparatus for mechanically cleaning hot soldering iron bits or tips which are contaminated with contaminants such as tin oxides and soldering residues. The apparatus possesses at least one electrically driven rotating cleaning body.

In Swiss Pat. No. 629,399 and the cognate U.S. Pat. No. 4,394,785, granted July 26, 1983, an apparatus of the above-mentioned type is described and illustrated. Hitherto, a flat piece of felt or a sponge was frequently used for cleaning hot soldering iron bits or tips contaminated with, for example, tin oxides and soldering residues. This type of cleaning is impractical, incomplete and frequently causes soldering splashes or splatters at the workbench which cannot be tolerated, especially during precision soldering of electronic apparatus. For this reason, the apparatus according to the above-mentioned U.S. Pat. No. 4,394,785 was developed.

The aforementioned problem is solved by means of a cleaning apparatus comprising two cleaning bodies driven by an electric motor. The hot soldering iron bit or tip is briefly placed between the two cleaning bodies which rotate towards and in contact with each other. These cleaning bodies enclose the soldering iron bit or tip and clean the same in a protective manner. The cleaning bodies are mounted inside a removable holder or cage. For purposes of increasing the self-cleaning effect of the two cleaning bodies, the spacing between the axes of the two cleaning bodies is smaller than their average diameter. Additionally, related strippers or scrapers engage each one of the cleaning bodies.

The above-mentioned apparatus is always in operation when the apparatus is connected to the mains and a switch is switched-on. In the case of only rare soldering work, for instance, only between long time intervals per day, it is convenient to manually turn-off the apparatus by means of the switch. In this manner, there is not only saved electricity, but also the apparatus itself is protected. Unnecessary operating noises are prevented. This can be particularly important when using the apparatus, for example, in a research laboratory, where the presence of even relatively slight noises can be disturbing.

SUMMARY OF THE INVENTION

Therefore, with the foregoing in mind, it is a primary object of the present invention to provide a new and improved construction of an apparatus for mechanically cleaning soldering iron bits or tips which is not afflicted with the drawbacks and limitations of the prior art constructions heretofore discussed.

Another and more specific object of the present invention aims at providing a new and improved construction of an apparatus for mechanically cleaning soldering iron bits or tips and which apparatus is automatically switched-off during interruption or cessation of soldering work.

Now in order to implement these and still further objects of the invention, which will become more readily apparent as the description proceeds, the apparatus of the present development is manifested by the features that, the apparatus is equipped with a holder or container for storing or holding the soldering iron. This holder in turn is mechanically connected with an actuating or contact member of a switch for operating the drive motor for rotating the cleaning body.

It is one advantage of this construction that the apparatus can be automatically switched-off by inserting the soldering iron into the holder or container.

An advantageous further development of the inventive apparatus resides in the fact that the holder is mechanically connected by means of a carrier or support with a contact or actuating member of a switch for operating the drive motor. In this case, the soldering iron loads the actuating member of the switch by means of the holder or container and the carrier or support and the switch is operated thus interrupting the current conduction to the drive motor and switching off the apparatus. When the soldering iron is removed or withdrawn from the holder or container to continue with the work, the actuating member of the switch is load-relieved again and switches on the current circuit of the drive motor.

Preferably, the holder or container comprises a carrier or support which is inserted into the actuating member of the switch for operating the drive motor. This is especially advantageous for transporting the inventing apparatus, because then the holder or container can be withdrawn or removed and stored next to the housing of the cleaning apparatus.

Advantageously, the switch for operating the drive motor constitutes a toggle switch. During insertion of the soldering iron into the holder or container, this actuating member of the switch which is mechanically connected to the holder or container by means of the carrier or support tilts about its axis or pivot shaft thereby operating the switch which switches off the current to the drive motor.

In accordance with another variant of the inventive apparatus, the switch for operating the drive motor constitutes a pressure sensitive switch. In this case, the actuating member reacts to the weight of the soldering iron and moves at least substantially in vertical direction.

For reasons of safety, it is advantageous if a master or main switch is series-connected with the switch for operating the drive motor which is mechanically connectable with the holder or container. It is possible to forget to insert the soldering iron into the holder or container, or the soldering iron can be removed or withdrawn from the holder, for example, during cleaning operations. In this case, the apparatus would be in unused operation for a lengthy period of time. Although the apparatus is designed for continuous operation, long running times without actual cleaning use of the apparatus would be inappropriate.

In accordance with a further development of the inventive apparatus, slots for ventilation are formed in a sleeve of the holder or container. These ventilation slots prevent an undue rise in the temperature inside the holder or container.

It is advantageous to place a perforated metal cylinder inside the sleeve. This perforated metal cylinder prevents the hot soldering iron bit or tip from making direct contact with the sleeve of the holder or container. In this manner, a better heat insulation of the sleeve of the holder or container is achieved. Additionally, it is advantageous that the hot soldering iron bit or tip contacts only the metal, so that the remaining components of the holder or container can be manufactured from a suitable plastic material.

Advantageously, the actuating member of the switch for operating the drive motor possesses a bore for insertion of a carrier or support of the holder or container. If the carrier of the holder or container is provided with at least one rib, the bore of the actuating member is provided with at least two cut-outs or recesses for the rib. This further development possesses the advantage that the holder or container can be readily mechanically connected with the actuating member via the carrier or support and that the rib can be secured against possible rotation. The at least two cut-outs or recesses for receiving the rib of the carrier enable the holder or container to be placed in the most suitable position for manipulation.

An advantageous construction of the holder or container resides in the features that the same is longitudinally displaceably arranged with respect to its carrier. This structural arrangement enables adjusting the holder in the correct functional position with respect to the actuating member such that the combined center of gravity of the holder and the soldering iron is sufficiently eccentric to cause pivoting of the actuating member and thus operate the switch for the drive motor.

BRIEF DESCRIPTION OF THE DRAWINGS

The invention will be better understood and objects other than those set forth above will become apparent when consideration is given to the following detailed description thereof. Such description makes reference to the annexed drawings wherein throughout the various figures of the drawings there have been generally used the same reference characters to denote the same or analogous components and wherein:

FIG. 1 is a partially sectional view of an exemplary embodiment of the inventive apparatus and in which a holder, an associated carrier or support thereof and an actuating member of a switch for operating the drive motor of such apparatus are illustrated in side view;

FIG. 2 is a section along the line II—II in FIG. 1 through a sleeve of the holder or container attached to the associated carrier or support of the apparatus shown in FIG. 1;

FIG. 3 is a section along the line III—III in FIG. 2 through the carrier for the sleeve of the holder or container shown in FIG. 2;

FIG. 4 is a section along the line IV—IV in FIG. 1 through a mouthpiece of the holder of the apparatus shown in FIG. 1;

FIG. 5 is a section along the line V—V in FIG. 4 through the mouthpiece shown in FIG. 4;

FIG. 6 is a longitudinal section through the sleeve of the holder of the apparatus shown in FIG. 1;

FIG. 7 is a side view of the actuating member of the switch for operating the drive motor in the apparatus shown in FIG. 1;

FIG. 8 is a longitudinal section through the actuating member of the switch for operating the drive motor shown in FIG. 7;

FIG. 9 is a top plan view of the actuating member of the switch for operating the drive motor shown in FIG. 7;

FIG. 10 is a schematic electrical circuit diagram showing the connection of a drive motor with the switch for operating the drive motor in the apparatus shown in FIG. 1;

FIG. 11 is a schematic electrical circuit diagram illustrating a further connection of the drive motor and the switch for operating the drive motor in the apparatus shown in FIG. 1 and in which additionally a main or master switch is utilized; and FIG. 12 is a perspective view of the exemplary embodiment of the inventive apparatus shown in FIG. 1 and also shows a soldering iron in broken lines.

DETAILED DESCRIPTION OF THE PREFERRED EMBODIMENTS

Describing now the drawings, it is to be understood that to simplify the showing thereof, only enough of the structure of the apparatus for cleaning soldering iron bits or tips has been illustrated therein as is needed to enable one skilled in the art to readily understand the underlying principles and concepts of the present invention. Turning now specifically to FIG. 1 of the drawings, the apparatus depicted by way of example and not limitation is seen to comprise an apparatus 1 for cleaning soldering iron bits or tips of soldering irons and a holder or container 2 provided therefor. This holder or container 2 contains a mouthpiece 3 and a sleeve 4. A number of parallel slots 5 are formed in the sleeve 4 and, for the sake of clarity, only three such slots 5 are illustrated.

The holder or container 2 is fastened at a carrier or support 6. In the presently described exemplary embodiment, the holder or container 2 is connected with a rail or rack 7 which is at least partially provided with teeth 8. A slide component or member 9 is displaceably arranged on the rail or rack 7. This construction permits adjusting the holder or container 2 within sufficient limits with respect to the carrier or support 6. For fixing the relative position of the holder or container 2 and the carrier or support 6, the slide component or member 9 possesses an elastic tongue 10 which engages the teeth 8. The double-headed arrows indicate two possible movement directions of the holder or container 2.

The actual apparatus for mechanically cleaning the soldering iron bits or tips carries two substantially cylindrical cleaning bodies 11 consisting of an elastic material, for instance, sponge. These cleaning bodies 11 are arranged on hexagonal mounting or bearing journals 12 and are laterally fixed by means of not particularly illustrated fasteners. Both mounting or bearing journals 12 are driven via a drive or gear by means of a not particularly shown drive motor. The mounting or bearing journals 12 are rotatably mounted within a holder or cage 13 and this holder or cage 13 is provided with two strippers or scrapers 14 which engage into the surface of the cleaning bodies 11. The diameters of the substantially cylindrical cleaning bodies 11 are designated by reference characters $d_1$ and $d_2$. The spacing a of the axes of the mounting or bearing journals 12 is smaller than half the sum of both the diameters $d_1$ and $d_2$, so that both cleaning bodies 11 are pressed upon each other.

The cleaning bodies 11 rotate with different rotational speeds and in opposite directions, which are indicated by arrows in FIG. 1. The soldering iron bits or tips are cleaned in the region of the compressed surfaces of the cleaning bodies 11. The holder or cage 13 is loosely mounted in a bottom housing member or section 15. Thus, after the removal of a trough-shaped lid 45, which will be described later, the holder or cage 13 can be simply removed for cleaning, if desired. The holder or cage 13 is provided on both sides with related sidewalls 17 with protruding members which project past the cleaning bodies 11 and which serve for removing or withdrawing the holder or cage 13.

A sidewall 18 of the electrical component is provided with a vertical partition or partition wall 16, so that the electrical component remains separated when the holder or cage 13 is removed or withdrawn. A power cord 19 is connected to the mains and is held between a number of safety or protection nubs 20 and 20'. The individual connecting cables 22 are partly fed through a switch 40 for operating the drive motor, see FIGS. 10 and 11. in the housing 24 and partly through a connecting terminal 21 to the drive motor which is not particularly illustrated in this figure. An actuating member or piece 23 of the above-mentioned switch 40 for operating the drive motor is also located in the housing 24 and in the presently described exemplary embodiment, the actuating member or piece 23 is arranged for tilting or pivoting about a pivot shaft 25. This pivot shaft 25 is mounted in the walls of the housing 24. This housing 24 is pushed into holders or retainers 26 which are connected with the sidewall 18 of the electrical component. This sidewall 18 is provided with a cut-out or recess 27 through which the connection cables 22 are led to the drive motor.

FIG. 2 shows a section along the line II—II in FIG. 1. This section cuts through the sleeve 4, so that there are shown in this FIG. 2, fins or rib-like members 28 between which the slots 5 extend. An annular rear part 29 of the holder or container 2 possesses a round or circular hole 30 through which there passes the rear end of a coaxial perforated metal cylinder 31 which is held by means of an outer wall 30a of the hole 30. A rib 32 is formed at the carrier or support 6 of the holder or container 2 and is shown in the bottom part of FIG. 2. There is also seen in FIG. 2, the section through the rail or rack 7 and the slide component or member 9 shown in FIG. 1.

FIG. 3 shows a section along the line III—III in FIG. 2. In this section there is readily visible the one-piece or integral construction of the carrier or support 6 with the rib 32.

FIG. 4 shows a section along the line IV—IV through the mouthpiece 3 illustrated in FIG. 1. In this section, there is seen a wall 33 of the mouthpiece 3 and which then further extends with a substantially conical inner wall 34 up to a substantially cylindrical opening 35 of the mouthpiece 3.

In FIG. 5 there is represented a section along the line V—V in FIG. 4. In addition to the substantially conical surface 34 and to the substantially cylindrical opening 35, there is also shown a substantially cylindrical contact surface 36 of the mouthpiece 3 for insertion into the sleeve 4. A further substantially cylindrical contact surface 37 with a smaller diameter serves for insertion into the perforated metal cylinder 31. For the sake of clarity, this perforated metal cylinder 31 is only shown by its outer parts.

The longitudinal section through the holder or container 2 shown in FIG. 6 illustrates the one-piece or integral construction of the slightly conical sleeve 4 with the annular-shaped rear part 29 of the holder or container 2. Also in this FIG. 6, only three slots 5 are illustrated. The arrow 36 indicates the direction of insertion of the substantially cylindrical contact surface 36 shown in FIG. 5. For the sake of clarity, the perforated metal cylinder 31 is removed from the sleeve 4 in this example.

FIG. 7 shows a view of the actuating member or piece 23. Also seen in this FIG. 7 is the tilt or pivot shaft 25 of the actuating member or piece 23 which is also visible in FIG. 1.

FIG. 8 contains a longitudinal section through the actuating member or piece 23 shown in FIG. 7. A hole or bore 38 is formed inside the actuating member or piece 23, for the insertion of the carrier or support 6 of the holder or container 2 and contains recesses or cut-outs 39 for fixing the rib 32 of the carrier or support 6.

FIG. 9 represents a top plan view of the actuating member or piece 23. This FIG. 9 shows, in addition to the tilt or pivot shaft 25 and the hole or bore 38, three recesses or cut-outs 39 for the rib 32 of the carrier or support 6. Therefore, during operation of this exemplary embodiment and with respect to a favorable manipulation during soldering work, three different positions of the holder or container 2 can be selected with respect to the housing of the inventive apparatus.

FIG. 10 shows a simple schematic electrical circuit diagram for the power supply to a drive motor 41. The current is switched-on by means of the switch 40 for operating the drive motor 41 which is mechanically connected with the holder or container 2 by means of the actuating member or piece 23 and the carrier or support 6. This switch 40 for operating the drive motor 41 is a toggle switch and the actuating member or piece 23 thereof is illustrated in FIGS. 7 to 9. Of course, the current circuit is connected to the mains 42.

FIG. 11 illustrates a further variant of the circuit diagram. In this case, the schematically illustrated switch 40 for operating the drive motor 41 is a pressure sensitive switch which is switched-off by the load of the soldering iron inserted into the holder or container 2 acting through the carrier or support 6 and the actuating member or piece 23. A main or master switch 43 is series-connected with this switch 40 for operating the drive motor 41. This main or master switch 43 serves as a safety switch in the case that the switch 40 for operating the drive motor 41 is mistakenly left in the switched-on position, i.e. in the unloaded or load-relieved position or is purposely left in this position. This main or master switch 43 is manually switched-on or off and can be constructed as a slightly luminescent knob.

FIG. 12 illustrates a perspective view of the exemplary embodiment of the inventive construction of the cleaning apparatus. In this FIG. 12, there is also shown a top housing portion 44 which mainly serves to protect the electrical portion of the apparatus. There is also shown a trough-shaped lid or cover 45 which can be removed without the use of tools and which thus allows access to the holder or cage 13 and the cleaning bodies 11. For the sake of clarity, a soldering iron 47 is also shown in broken lines and the soldering iron bit or tip 46 is inserted between the cleaning bodies 11. On the upper surface of the top housing portion 44, there are illustrated two switches. On the left, there is shown the actuating member or piece 23 of the toggle switch 40 for operating the drive motor 41 and the hole or bore 38 formed therein with the recesses or cut-outs 39 for the rib 32 of the carrier or support 6. On the right, there is shown the button or knob of the main or master switch 43 and a designation 48 for the switched-off position of the main switch 43.

It is self-evident that the inventive subject matter is not limited to the illustrated embodiment. For example, there can also be used a different arrangement of the electrical component or different carrier or support constructions. Instead of the above-mentioned sponge for the cleaning bodies 11, other materials can be used. Advantageously, the cleaning bodies 11, when using porous materials, are wetted by water or any other appropriate liquid.

In analogous manner, the apparatus can also be built-in or installed in a covered manner at a working place such as a laboratory table, testing place or a manufacturing installation.

While there are shown and described present preferred embodiments of the invention, it is to be distinctly understood that the invention is not limited thereto, but may be otherwise variously embodied and practiced within the scope of the following claims.

Accordingly, what I claim is:

1. An apparatus for mechanically cleaning hot soldering iron bits contaminated with contaminants such as tin oxides and soldering residues, comprising:
    at least one electrically driven rotating cleaning body;
    a holder for storing a soldering iron containing said soldering iron bit;
    a drive motor for driving said at least one rotating cleaning body;
    a switch for operating said drive motor;
    an actuating member associated with said switch;
    means mounting said actuating member for movement relative to said switch; and
    said holder being mechanically connected with said actuating member such that the switching on and off of the cleaning apparatus is automatically effect by withdrawing and inserting the soldering iron which moves the actuating member relative to said switch.

2. The apparatus as defined in claim 1, wherein:
   said holder comprises a carrier;
   said actuating member possesses a bore; and
   said holder being mechanically connected with said actuating member by insertion of said carrier into said bore of said actuating member.

3. The apparatus as defined in claim 1, wherein:
   said switch for operating said drive motor constitutes a toggle switch.

4. The apparatus as defined in claim 1, wherein:
   said switch for operating said drive motor constitutes a pressure sensitive switch.

5. The apparatus as defined in claim 1, further including:
   a main switch series-connected with said switch for operating said drive motor such that said main switch is capable of preventing operation of said drive motor irrespective of the state of said switch for operating said drive motor.

6. The apparatus as defined in claim 1, wherein:
   said holder possesses a sleeve containing slots for ventilation.

7. The apparatus as defined in claim 6, further including:
   a perforated metal cylinder; and
   said perforated metal cylinder being placed inside said sleeve of said holder.

8. The apparatus as defined in claim 1, wherein:
   said holder is provided with a carrier for supporting said holder;
   said actuating member possessing a bore for insertion of said carrier of said holder;
   said carrier of said holder possessing at least one rib; and
   said bore of said actuating member being provided with at least two recesses for receiving said at least one rib of said carrier.

9. The apparatus as defined in claim 8, wherein:
   said holder is longitudinally displaceably arranged with respect to said carrier.

10. The apparatus as defined in claim 1, wherein:
    said holder has carrier means and constitutes a movable holder;
    said actuating member having receiving means for mechanically connecting said carrier means such that motion of said holder is transmitted to said actuating member; and
    said actuating member being structured to transmit motion to said switch for operating said drive motor.

* * * * *